Nov. 1, 1960
N. R. EMERY
2,958,401
HYDRAULIC SLACK ADJUSTING DEVICE
Filed June 3, 1957
3 Sheets-Sheet 1
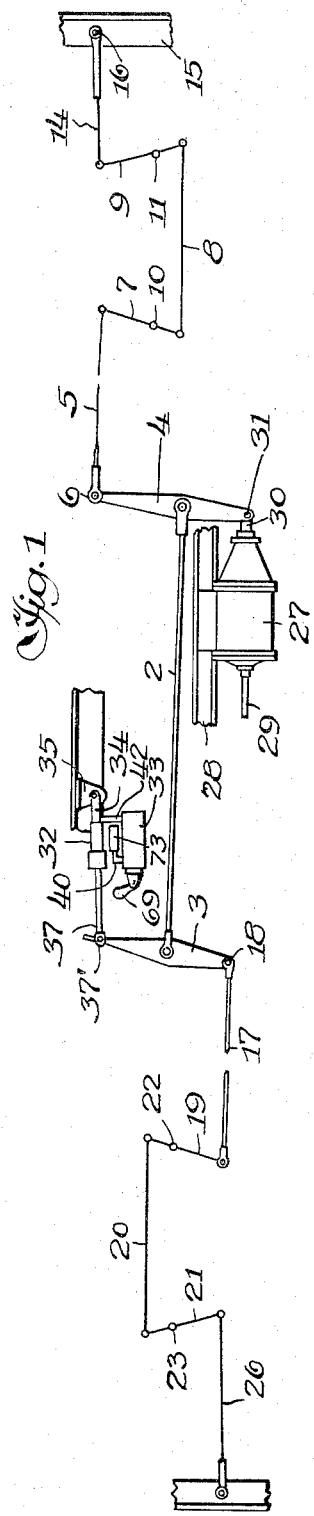
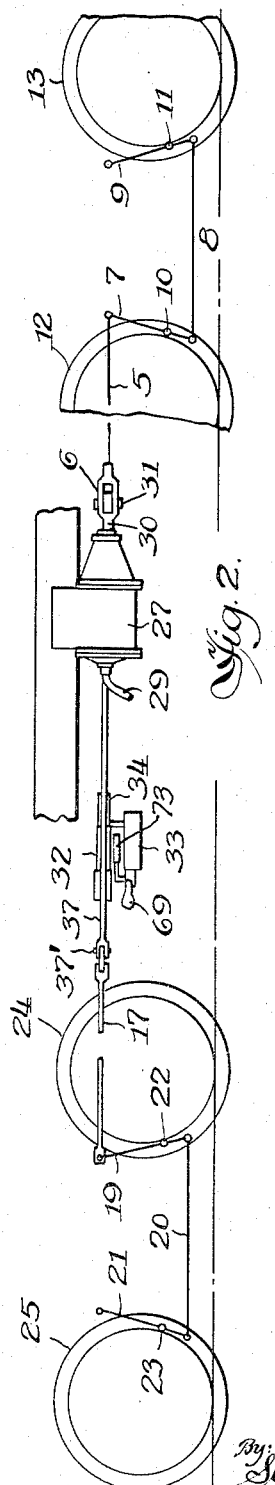
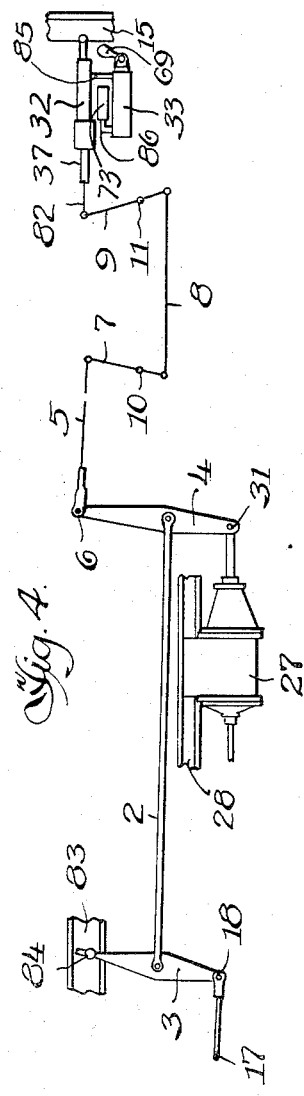
Inventor,
Neville R. Emery,
By Schneider, Dressler
& Goldsmith, Attys.

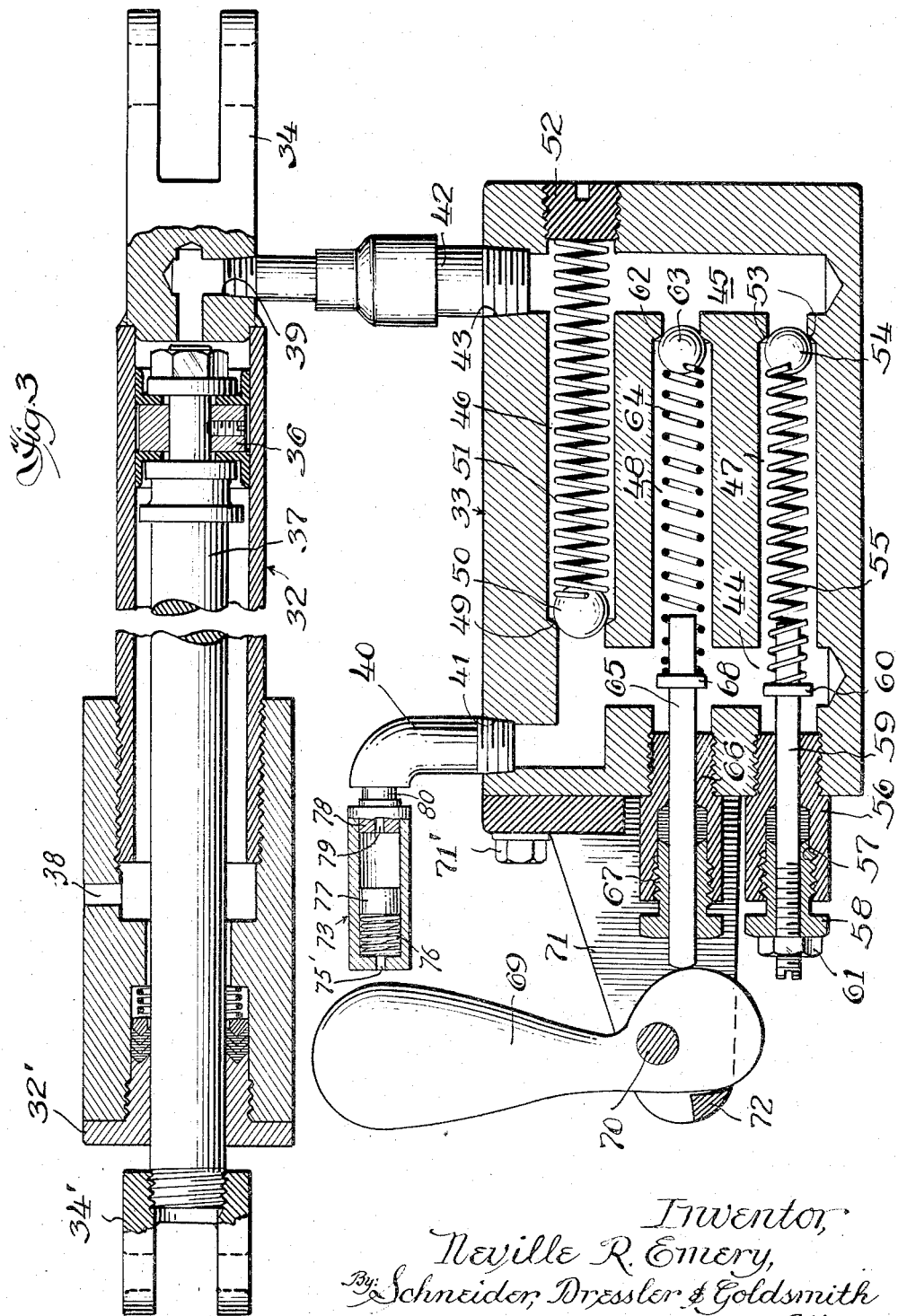

United States Patent Office 2,958,401
Patented Nov. 1, 1960

2,958,401

HYDRAULIC SLACK ADJUSTING DEVICE

Neville R. Emery, 649 N. Main St., Charlotte, Mich.

Filed June 3, 1957, Ser. No. 663,148

13 Claims. (Cl. 188—198)

This invention relates to a hydraulic slack adjusting device for automatically adjusting the slack in the brake rigging of railway cars to compensate for brake shoe wear and for any wear that may take place in the brake rigging.

The hydraulic slack adjusting device of the present invention may be installed very simply on any type of railway car. In most cars it is applied centrally of the brake system, but in cars where such mounting is not feasible, it may be mounted between either the foremost or rearmost truck lever and the adjacent end of the car. The only adjustment necessary is to set the valve pressure at the time of the original installation to provide the proper flow of oil in the adjusting cylinder when the applied brake shoe pressure reaches the predetermined pressure to be applied to the wheels of the car for stopping it.

The oil system of the slack adjusting device is a closed system that remains constant and provides a positive control of the travel of the piston in the adjusting cylinder when the brakes are applied, thereby controlling the travel of the air cylinder piston rod to insure accurate braking. The slack adjusting device is self-contained and does not cause any drain on the air used to operate the brake shoes.

The slack adjusting device comprises an adjusting cylinder, a valve for controlling movement of the piston in said cylinder, and an oil reservoir. The cylinder is secured to a railway car body and has a piston rod secured to one end of an adjusting lever. Upon the application of air pressure, the lever moves pivotally to take up any slack in the brake rigging and the pressure then moves the brake shoes into braking engagement with the wheels. As soon as the pressure against the shoes exceeds the pressure for which the valve is set it moves a check valve in a controlled oil flow line of the valve to permit the oil in the closed hydraulic system to flow from the adjusting cylinder into a reservoir. The oil flow from the adjusting cylinder into the reservoir causes the piston rod to move inwardly of the adjusting cylinder and limits the application of pressure to the brake shoes to the predetermined amount in accordance with the original setting of the valve.

When the air pressure is released the brake shoes fall away from the wheels a predetermined distance according to the amount of movement permitted by the brake rigging. The movement of the brake shoes and rigging away from the wheels is always the same and causes the piston rod to move outwardly of the adjusting cylinder. The position of the piston rod relative to the adjusting cylinder is gradually changed, since each increment of slack increase causes the adjusting lever to move to take up the increased slack. Accordingly, each increment of slack increase causes the piston rod to move inwardly of the cylinder a slightly shorter distance upon the succeeding application of braking pressure. Therefore the distance of the end of the piston rod from the cylinder after each brake release is gradually increased.

When a brake shoe is to be replaced, a different oil flow line in the valve is opened to permit the oil to flow freely so that the brake shoes and rigging may be manually moved from the wheels without difficulty to permit insertion of the replacement. No adjustment of the brake rigging is necessary because the first release of the air pressure after an initial application of the new brake shoe will position the piston rod and adjusting lever in the correct position.

The structure by means of which the above and other advantages are attained will be described in detail in the following specification, taken in conjunction with the accompanying drawings, showing two preferred illustrative embodiments of the invention, in which:

Figure 1 is a schematic plan view illustrating a freight car brake rigging with the slack adjusting device embodying the invention positioned therein, the front and rear trucks being rotated 90° in opposite directions from their true position to facilitate illustration of the brake linkage;

Fig. 2 is a schematic side elevation of the structure shown in Fig. 1;

Fig. 3 is a view, partly in section and partly in elevation, showing the slack adjusting device and the oil reservoir connected to a pipe leading from one end of the valve;

Fig. 4 is a fragmentary schematic plan view illustrating a modified embodiment of the invention in which the slack adjusting device is mounted adjacent one end of the car.

Figure 5:
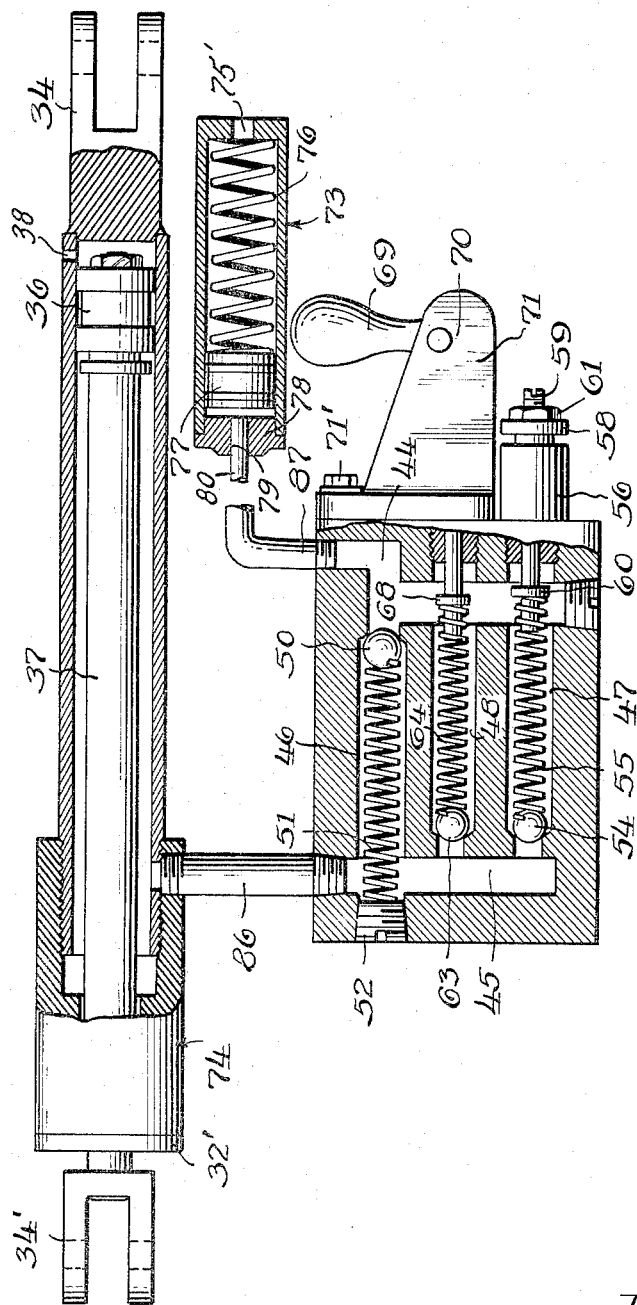
Fig. 5 is a view, partly in section and partly in elevation, of the adjusting cylinder, valve and associated oil reservoir as connected in the embodiment of Fig. 4.

In the drawings, the reference numeral 2 indicates a center brake rod pivotally secured at one end to the center portion of an adjusting lever 3, and at its other end to the center portion of a floating cylinder lever 4. A front brake rod 5 is secured at one end to one end of the floating lever 4, as indicated at 6, and at its other end to conventional truck levers 7, 9, and connecting rod 8, for applying brake shoes 10 and 11 to the wheels 12 and 13, respectively, of the front truck. A rod 14 is secured at one end to the truck lever 9 and at its other end to the front end 15 of a car body, as indicated at 16.

A rear brake rod 17 is pivotally secured to one end of the adjusting lever 3, as indicated at 18, and to conventional rear truck levers 19, 21 and connecting rod 20, for applying brakes shoes 22 and 23 to the wheels 24 and 25, respectively, of the rear truck. A rod 26 is secured to the rear end of the car body.

An air cylinder 27 mounted on the understructure 28 of the car body and connected by a line 29 to an air supply (not shown) has a piston rod 30 pivotally connected to the opposite end of floating lever 4, as indicated at 31. When the air is applied through cylinder 27, the piston rod 30 of the air cylinder moves outwardly to move the lower end of the floating lever 4 forwardly, or to the right, as viewed in Fig. 1. The floating lever 4 pulls the front brake rod 5 to the left, and pulls the center brake rod 2 in the opposite direction. The center brake rod pulls the adjusting lever 3 to the right, and, through the action of the rear brake rod 17 and the rear truck levers, applies the brake shoes 22 and 23 to the wheels 24 and 25, respectively, simultaneously with the application of brake shoes 10 and 11 to wheels 12 and 13, respectively.

The adjusting device comprises a hydraulic adjusting cylinder 32, a valve housing 33 and an oil reservoir 73 associated therewith. The front end of the adjusting cylinder has a clevis 34 secured to a bracket 35 mounted on the car body. As seen in Fig. 3, a piston 36, slidably mounted in the adjusting cylinder 32, has connected thereto a piston rod 37 extending out of the rear end of the cylinder. A clevis 34' threaded on the outer end of the piston rod 37 is pivotally secured to one end of the adjusting lever 3, as indicated at 37'. The piston 36 is provided with any suitable packing to prevent oil on the front side of the piston from leaking to the rear side of the cylinder. The rear end of the cylinder is provided with a plug 32' which has an aperture through which the piston rod 37 is slidable. A suitable oil hole (not shown) is provided so that the oil may be replenished when necessary. Cylinder 32 is provided with a conventional air vent 38 adjacent its rear end.

The adjusting cylinder 32 has an opening 39 at the front side of the piston. An oil pipe 40 having one end threaded into an opening 41 in one end of the valve housing 33 has its other end connected to an oil reservoir 73, as hereinafter described. Another oil pipe 42 having one end threaded into the opening 39 has its other end threaded into an opening 43 in the opposite end of the valve housing. The opening 41 extends substantially across the first mentioned end of the valve housing to form a passageway 44 which terminates short of the edge of the valve housing opposite the opening 41. The opening 43 extends substantially across the valve housing to form a passageway 45 which also terminates short of the opposite edge of the valve housing.

The valve housing 33 is provided with a bore 46, extending from one end of the valve housing across the passageway 45 and terminating in the passageway 44, and two bores 47 and 48, extending from the opposite end of the valve housing 33 across the passageway 44 and terminating in the passageway 45.

The bore 46 constitutes a free flow oil line permitting oil to flow freely from the oil reservoir to the front side of the piston 36. This bore has an internal annular shoulder 49 adjacent the passageway 44 and has a check valve comprising a ball 50 pressed against the shoulder 49 by a spring 51 to prevent the oil from flowing through this line in the opposite direction. A plug 52 screwed into the open end of bore 46 permits assembly of the check valve in this line.

The bore 47 constitutes a controlled flow oil line permitting the oil to flow from the front side of the piston 36 to oil reservoir 73 under certain pressure conditions hereinafter discussed. The bore 47 has an internal annular shoulder 53 adjacent the passageway 45 and a ball 54 is pressed thereagainst by a spring 55. A plug 56 threaded into the open end of bore 47 is provided with a threaded recess 57 to receive second plug 58. The plugs 56 and 58 are each provided with aligned apertures in which a stud or pin 59 is positioned.

The double plug structure is preferred over a single plug because it provides a more effective oil seal. The stud 59 has its inner end positioned within the coils of spring 55 and is provided with a collar 60 adapted to engage one end of the spring to hold it under compression. A nut 61 threaded against the outer end of the plug 58 holds the stud 59 in predetermined position to regulate the amount of pressure that must be exerted against the ball 54 to move it away from the shoulder 53 to permit the oil to flow through the controlled flow oil line 47.

The bore 48 is similar to the bore 47 and has a shoulder 62 and a ball 63 pressed thereagainst by a spring 64. A stud 65 projecting through two interrelated plugs 66 and 67 has a collar 68 pressing against the spring 64. A cam shaped lever 69 is pivotally mounted on a pin 70 extending between a spaced pair of ears 71 projecting from one end of the valve housing 33. The ears 71 are secured to the valve housing 33 by a plurality of bolts 71'. The cam surface of the lever 69 engages the outer end of the stud 65 which projects beyond the outer end of the plug 67.

In the horizontal position of the lever 69 the stud 65 is pressed toward the right (Fig. 3), and the collar 68 holds the spring 64 compressed tightly to prevent movement of the ball 63. The cam shaped lever 69 may be manually moved from its normal horizontal position to vertical position to allow the stud 65 to move to the left and relieve the spring 64 and thereby permit oil to flow freely from the front side of the piston to the oil reservoir. Otherwise a force at least equal to the braking pressure would be required to move a shoe holder away from the wheel to provide the clearance necessary to place a brake shoe in the shoe holder. The cam shaped lever 69 is ordinarily not moved to its vertical position except when a brake shoe is to be replaced, or when repairs are to be made to the brake rigging.

A stop member in the form of a lug 72 projecting inwardly from either ear 71 prevents the cam shaped lever 69 from moving beyond its normal horizontal position when it is moved from vertical position. The cam shaped lever is so shaped that when it is in the vertical position shown in Fig. 3 the weight of the portion of the lever above the pivot 70 is unequally distributed, the portion to the left of the pivot being substantially heavier than the portion to the right of the pivot. In the position of Fig. 3 spring 64 is not compressed and does not offer any substantial resistance to movement of stud 65 toward the right. The oil pressure on opposite sides of ball 63 is balanced when no pressure is being applied to the brakes. Accordingly, if lever 69 is inadvertently left in vertical position it will automatically fall into its horizontal position in response to jarring of the type incidental to the normal movement of a railway car.

In its horizontal position the cam lever 69 causes the collar 68 to exert enough pressure against the spring 64 to hold the ball 63 against the shoulder 62 even when the pressure of the oil in the opposite direction is strong enough to move the ball 54 in the controlled flow oil line 47 to open position. By proper selection of the spring 64 it is possible to make the ball 63 movable by the application of the same amount of pressure required to move ball 54. The controlled flow oil line 47 could then be eliminated and the oil line 48 could be used for the controlled flow of oil from the front side of the adjusting piston to the oil reservoir, but such structure would not permit any change in the pressure required to open the controlled flow oil line except by the substitution of a spring of different strength. In the preferred embodiment the compression of the spring 55 may be changed by merely rotating the threaded stud 59 in either direction.

Oil reservoir 73 is in the form of a tubular cylindrical body having a rear end 75 closed except for a conventional air vent 75'. A spring 76 enclosed in the cylindrical body has one end pressing against rear end 75 and its other end pressing against a plunger 77 which fits slidably in the cylindrical body. The front end of the reservoir is closed by a plug 78 provided with a bore 79 into which one end of a pipe 80 is snugly fitted, preferably by a threaded interengagement. The other end of pipe 80 is connected by any suitable joint to oil pipe 40 which has its other end threaded into opening 41 of valve block 33.

The operation of the slack adjusting device will be easily understood if the description thereof is preceded by a functional description of the structure when the brake system is in normal position ready for a braking operation.

In this position the floating lever 4 and the adjusting lever 3 are positioned to hold the brake rigging with normal slack therein, and each brake shoe is positioned a uniform distance from the wheel it engages during the braking operation. The piston rod 30 is in its innermost position with respect to the cylinder 27. The position of piston 36 in the cylinder 32 depends upon the condition of the brake shoes. If the brake shoes are new, the piston rod 37 will be in its innermost position, with piston 36 closely adjacent the front end of cylinder 32.

The oil pressure in the front end of cylinder 32 is equal to the pressure at which the brakes are designed to operate. When the brakes are to be applied, a certain, limited amount of air is forced into cylinder 27. The pressure exerted against the piston of piston rod 30 depends upon the volume of the space in which said limited amount of air is confined. The cylinder 27 is so dimensioned that when piston rod 30 is moved outwardly eight inches, the fixed amount of air forced into the cylinder will exert a pressure equal to the desired brake pressure against the piston of piston rod 30. If the piston rod 30 is not moved outwardly eight inches, the space in which the fixed amount of air is confined will be less, and, consequently, the pressure will be greater than the desired brake pressure. If the piston rod 30 is moved more than eight inches, the air space will be larger, and the pressure will be less.

The braking operation is initiated by forcing the fixed amount of air into cylinder 27. The air pressure moves piston rod 30 to the right, as viewed in Fig. 1. The movement of piston rod 30 to the right moves the lower end of floating lever 4 in the same direction. Floating lever 4 pivots about the right end of center brake rod 2 and moves the upper end of lever 4 to the left. The upper end of lever 4 is connected to the brake rigging for the front end of the brake system and pulls it tight, removing all of the slack and moving the brake shoes 10 and 11 into engagement with the wheels 12 and 13. The upper end of lever 4 cannot move to the left past the point where the brake shoes 10 and 11 engage the front wheels. Continued movement of piston rod 30 to the right pulls the center brake rod 2 to the right.

Center brake rod 2 tends to pull adjusting lever 3 to the right, but, since the pressure of the oil in front of piston 36 in cylinder 32 prevents the upper end of lever 3 from moving to the right, only the lower end is able to move. The lower end of lever 3 moves to the right and pulls the rear brake rigging tight and moves brake shoes 22 and 23 into engagement with rear wheels 24 and 25. Each brake shoe is close to its wheel, and the movement of the levers 3 and 4 to take up the slack is so short that both levers move substantially simultaneously. Each brake shoe is in engagement with its wheel almost instantaneously upon the application of air to the cylinder 27.

After each of the brake shoes engages its wheel the piston rod 30 continues to move to the right. This continued movement of the piston rod 30 and the lower end of lever 4 to the right is possible because the upper end of lever 3 also moves to the right. The movement of the upper end of lever 3 to the right forces oil past ball valve 54 to prevent excessive brake pressure. When the piston rod 30 moves the full eight inches, there is not enough pressure against valve 54 to hold it open, and as soon as spring 55 moves valve 54 to closed position, spring 76 moves plunger 77 to the right, forcing oil from the reservoir 73 through the free flow passage 46 to balance the pressure on both sides of piston 36 and keep the brake pressure constant until the air pressure is released.

When the brakes are released, the air is exhausted from cylinder 27, and piston rod 30 is free to move to the left into said cylinder. The weight of the brake shoes and rigging causes the brake shoes to fall away from the wheels a predetermined distance that is regulated by the weight of the shoes and rigging and is always approximately uniform. The releasing movement of the brake shoes and rigging pulls the lower end of lever 3 to the left and the upper end of lever 4 to the right. The movement of the lower end of the lever 3 to the left at every release of the braking pressure is approximately uniform because it is limited by the movement of the brake shoes, which is uniform regardless of the amount of slack in the brake system at the start of the braking operation.

The movement of the upper end of lever 3 to the left after each brake release is not limited by the movement of the brake shoes. The only pressure against the back side of the piston 36 is atmospheric pressure, and there is no other hinderance to movement of piston 36 to the left upon release of the brakes. Accordingly, when the lower end of lever 3 moves to the left, the upper end of said lever also moves to the left, and the oil pressure against the front of piston 36 causes the piston rod 37 and the upper end of lever 3 to continue moving to the left to take up any excess slack in the brake rigging.

The slack adjusting cylinder is so designed that piston 36 is closely adjacent the front end of cylinder 32 when the brake shoes are new. At each brake release the piston 36 moves farther to the left upon the brake release than it does to the right upon the application of the brakes and the pivot point 37' is moved to the left a distance slightly to the left of the position occupied by it after the previous brake release, thus changing the angularity of lever 3 and shifting the position of the pivot 37' to the left after every braking operation. This difference in the position occupied by the pivot 37' after successive braking operations is dependent upon the amount of slack created during each braking operation.

The movement of the upper end of lever 3 represented by the difference between the positions of pivot point 37' after two successive braking operations causes the lower end of lever 3 to move to the right and the upper end of lever 4 to move to the left far enough to take up the slack created by the braking operation. The brake system is then ready for the next braking operation.

The movement of the brake shoes into engagement with the wheels at the start of any braking operation is always substantially the same, regardless of the amount of slack created during the preceding braking operation. No excess slack can be present in the brake system at the start of a braking operation because the movement of the lower end of lever 3 to the left after the brake release is limited by the movement of the brake shoes away from the wheels. The excess slack is taken up by the movement, after each brake release, of the upper end of lever 3 to the left of the position it occupied before the braking operation.

The embodiment of the invention illustrated in Figs. 4 and 5 is similar to the embodiment of Figs. 1 to 3 except that the slack adjusting device is positioned forwardly of the floating lever 4, and therefore must exert a pulling force upon that lever instead of a pushing force as in the embodiment of Figs. 1 to 3. The structure of the slack adjusting device is the same in both these embodiments, but in Figs. 4 and 5 the adjusting cylinder 32 is secured at its front end to front end 15 of the car and the outer end of the piston rod 37 is secured to the end of a rod 82 which replaces the rod 14. One end of lever 3 is pivotally secured to the part 83 of the car, as indicated at 84.

In Figs. 4 and 5 the valve housing 33 is reversed relative to the cylinder 32. A pipe 86 connects the passageway 45 to the cylinder 32 at the rear side of the piston 36. Another pipe 87 connects the passage way 44 to an oil reservoir 73. When the brakes are applied the rod 82 pulls the piston rod 37 towards the rear end of the cylinder 32 and forces the oil from the rear side of piston 36 through the controlled flow line 47 and into oil reservoir 73. When the brakes are released the oil flows from the oil reservoir through the free flow oil line 46 and into the cylinder 32 at the rear side of the piston.

The effect of the movement of the piston 36 within the cylinder 32 on the angularity of the levers 3 and 4 is the same as in the embodiments previously described, and the angularity of the levers is changed to compensate for slack in the brake rigging upon release of the air pressure after each application of the brakes. If desired, a slack adjusting device may be provided at each end of the car, but it is preferred to have a single structure take care of the brake rigging at both ends of the car. The arrangement of Figs. 4 and 5 is intended for use only on cars constructed in such manner that they do not have room to mount the slack adjusting device adjacent the lever 3.

While I have described two preferred embodiments of my invention in considerable detail, it will be understood that the description thereof is illustrative, rather than restrictive, as many details may be modified or changed without departing from the spirit or scope of my invention. Accordingly, I do not desire to be restricted to the exact structure described.

I claim:

1. A hydraulic slack adjusting device for use in the brake system on a railway car, said brake system comprising brake rigging, brake shoes secured to said brake rigging, and means for applying braking pressure to said brake shoes, said slack adjusting device comprising a cylinder having a piston and piston rod slidably mounted therein, said piston rod being operatively connected to the brake rigging and being movable thereby in opposite longitudinal directions upon the application and release of braking pressure, an oil reservoir, and a valve housing having an oil passageway adjacent each end, a pipe connecting one of said passageways to said oil reservoir, a second pipe connecting said other passageway to said cylinder in front of said piston, a plurality of parallel bores connecting said passageways within said valve housing, a check valve in one of said bores to permit free flow of oil in one direction, a second check valve in a second bore, said second check valve being reversed relative to said first mentioned check valve to prevent flow of oil therethrough in the free flow direction of said first mentioned bore, and pressure means applied to said second check valve to permit flow of oil therethrough in the opposite direction only upon the application of a predetermined pressure against said second check valve.

2. A hydraulic slack adjusting device for use in the brake system on a railway car, said brake system comprising brake rigging, brake shoes secured to said brake rigging, and means for applying braking pressure to said brake shoes, said slack adjusting device comprising a cylinder having a piston and piston rod slidably mounted therein, said piston rod being operatively connected to the brake rigging of a railway car and being movable thereby in opposite longitudinal directions upon the application and release of braking pressure, and an oil reservoir, and a valve housing having an oil passageway adjacent each end, an oil conduit connecting one of said passageways to said oil reservoir, a second oil conduit connecting said other passageway to said cylinder in front of said piston, three parallel bores connecting said passageways within said valve housing, a check valve in each of said bores, one of said check valves being reversed relative to the other two check valves, said first check valve permitting free flow of oil through the first bore in one direction, pressure means applied to a second check valve to control the flow of oil through the second bore in the direction opposite the free flow in the first bore, and manually releasable means holding the third check valve against the flow of oil through the third bore in the same direction as the flow in the second bore.

3. In a hydraulic slack adjusting device for use in the brake system on a railway car, a valve housing having three parallel bores each provided with a check valve, one of said check valves permitting free flow of oil through the first bore in one direction, said second and third check valves preventing flow of oil through said second and third bores in the direction of the free flow of oil in said first bore, pressure means applied to said second check valve to permit flow of oil through said second bore in a direction opposite the free flow of oil in said first bore only upon the application of a predetermined pressure against said second check valve, and manually releasable means holding said third check valve in position to prevent flow of oil through said third bore in either direction.

4. In a hydraulic slack adjusting device for use in the brake system on a railway car, a valve housing having a pair of bores each provided with a check valve, said check valves each comprising a ball, a spring engaging said ball, and a stud adapted to hold said spring under compression, adjustable means engaging one of said studs to regulate the pressure exerted against the spring engaged by said one stud, and a manually releasable lever engaging said other stud to hold it against said second spring, said lever being pivotally supported to extend vertically in its released position and so shaped that a preponderance of its mass is above and on one side of its pivot in said released position, whereby said lever is automatically movable from its released position to its holding position in response to jarring of the type incidental to the normal movement of a railway car.

5. In a hydraulic slack adjusting device for use in the brake system on a railway car, a valve housing having three parallel bores each provided with a check valve, one of said check valves permitting free flow of oil through the first bore in one direction, said second and third check valves preventing flow of oil through said second and third bores in the direction of the free flow of oil in said first bore, said second and third check valves each comprising a ball, a spring engaging said ball, and a stud adapted to hold said spring under compression adjustable means engaging one of said studs to regulate the pressure exerted against the spring engaged by said one stud, and a manually releasable lever engaging said other stud to hold it against said second spring, said lever being pivotally supported to extend vertically in its released position and so shaped that a preponderance of its mass is above and on one side of its pivot in said released position, whereby said lever is automatically movable from its released position to its holding position in response to jarring of the type incidental to the normal movement of a railway car.

6. In a hydraulic slack adjusting device for use in the brake system on a railway car, a valve housing having a bore provided with a check valve, and a cam shaped lever normally disposed in horizontal position and adapted in said horizontal position to hold said check valve in position to prevent flow of oil through said bore in either direction, said cam shaped lever being manually movable pivotally to vertical open position to permit flow of oil through said bore in one direction, and the weight of said cam shaped lever being so distributed relative to its pivotal axis that it is automatically movable from said vertical open position to its normal holding position in response to jarring of the type incidental to the normal movement of a railway car.

7. In a hydraulic slack adjusting device for use in the brake system on a railway car, a valve housing having three parallel bores each provided with a check valve, one of said check valves permitting free flow of oil through one of said bores in one direction, pressure means applied to said second check valve to permit flow of oil through said bore in a direction opposite the free flow of oil in said first bore only upon the application of a predetermined pressure against said second check valve, and a lever pivotally mounted adjacent one side of said valve housing, said lever normally holding said third check valve in position to prevent flow of oil through said third bore in either direction, said lever being manually movable to open position to permit the free flow of oil through said third bore in the same direction as the flow of oil through said second bore, the weight of said lever being so distributed relative to its pivot that it will cause said lever to move from said open position to its normal holding position in response to jarring of the type incidental to the normal movement of a railway car.

8. In a hydraulic slack adjusting device for use in the brake system on a railway car, a valve housing, a bore extending through said housing, a restriction in said bore, a ball positioned adjacent said restriction to prevent flow of oil therethrough in one direction, a compression spring in said bore, said spring being adapted to urge said ball against said restriction, a stud projecting through one end of said housing, said stud being adapted to press said spring toward said ball, and a manually releasable lever mounted adjacent the outer end of said stud and engageable therewith to hold said ball against said restriction, the weight of said lever when in released position being so distributed as to cause it to move automatically into said holding position in response to jarring of the type incidental to the normal movement of a railway car.

9. In a hydraulic slack adjusting device for use in the brake system on a railway car, a valve housing, a bore extending through said housing, a restriction in said bore, a ball positioned adjacent said restriction to prevent flow of oil therethrough in one direction, a compression spring in said bore, said spring being adapted to urge said ball against said restriction, a stud projecting through one end of said housing, said stud being adapted to press said spring toward said ball, and a cam shaped lever pivotally mounted adjacent the outer end of said stud, said lever being shaped to press said stud against said spring when in horizontal position and to release said stud from said pressure in its vertical position, the weight of said lever being so distributed relative to its pivotal mounting that it will automatically fall from said vertical position to said horizontal position in response to jarring of the type incidental to the normal movement of a railway car.

10. In a hydraulic slack adjusting device for use in the brake system on a railway car, said brake system including brake rigging having brake shoes attached thereto, a hydraulic system for controlling movement of said brake rigging, said hydraulic system including a valve adapted, in open position, to facilitate movement of said brake rigging to permit replacement of said brake shoes, and a normally horizontal lever adapted to hold said valve in closed position, said lever being manually movable pivotally to move it from said horizontal valve closing position to a vertical released position, the weight of said lever being so distributed relative to its pivot that it is automatically movable from said released position to said valve closing position in response to jarring of the type incidental to the normal movement of a railway car.

11. In a hydraulic slack adjusting device for use in the brake system on a railway car, said brake system including brake rigging having brake shoes attached thereto, a hydraulic system for controlling movement of said brake rigging, said hydraulic system including a valve adapted, in open position, to facilitate movement of said brake rigging to permit replacement of said brake shoes, and a lever adapted to hold said valve in closed position when said lever is disposed in horizontal position, said lever being movable manually into vertical position to release said valve from closed position, the weight of said lever being so distributed as to cause it to fall from said vertical position to said horizontal position automatically in response to jarring of the type incidental to the normal movement of a railway car.

12. In a hydraulic slack adjusting device for use in the brake system on a railway car, said brake system including brake rigging and brake shoes attached thereto, said slack adjusting device including a hydraulic cylinder and a piston, said piston being operatively connected to said brake rigging and movable in said hydraulic cylinder in response to movement of said brake rigging, an oil reservoir, a valve connected to said oil reservoir and one end of said hydraulic cylinder, said valve when in open position allowing free flow of oil from one side of said piston to said oil reservoir to thereby permit movement of said brake rigging sufficient to provide clearance for replacement of brake shoes attached to said rigging, and a lever normally disposed horizontally for holding said valve closed, said lever being manually operable to move it pivotally to vertical open position, the weight of said lever being so distributed relative to its pivot that it is automatically movable to valve closing position in response to jarring of the type incidental to the normal movement of a railway car.

13. In combination with a railway car brake rigging having brake shoes attached thereto and means for applying braking pressure to said brake shoes, a hydraulic slack adjusting device comprising a cylinder, a piston and piston rod slidable in said cylinder, and a lever movable longitudinally of said car with said brake rigging upon the application of braking pressure to said brake shoes, said piston rod being pivotally connected to one end of said lever, oil in said cylinder in front of said piston to prevent movement of said piston rod inwardly of said cylinder until a predetermined pressure is applied to said piston rod to overcome the pressure of said oil against said piston, thereby causing pivotal movement of said lever in response to forces of less magnitude than the pressure of said oil which tend to move said lever longitudinally of said railway car, said pivotal movement of said lever taking up any slack in said brake rigging prior to any longitudinal movement of said lever, and means to move said lever longitudinally of the railway car a uniform distance in the reverse direction upon each release of the brake pressure.

References Cited in the file of this patent
UNITED STATES PATENTS 1,834,575   Camp ------------------ Dec. 1, 1931